United States Patent [19]

Hieda

[11] Patent Number: 4,811,086
[45] Date of Patent: Mar. 7, 1989

[54] IMAGE SENSING APPARATUS

[75] Inventor: Teruo Hieda, Kanagawa, Japan

[73] Assignee: Canon Kabushiki Kaisha, Tokyo, Japan

[21] Appl. No.: 30,296

[22] Filed: Mar. 23, 1987

Related U.S. Application Data

[63] Continuation of Ser. No. 828,961, Feb. 12, 1986, abandoned.

[30] Foreign Application Priority Data

Feb. 12, 1985 [JP] Japan .................................. 60-23400
Feb. 27, 1985 [JP] Japan .................................. 60-36289
Apr. 15, 1985 [JP] Japan .................................. 60-78395

[51] Int. Cl.$^4$ ............................................. H04N 9/73
[52] U.S. Cl. ................................................... 358/29
[58] Field of Search ........................................ 358/29

[56] References Cited

U.S. PATENT DOCUMENTS 4,274,107 6/1981 Tamura ............................. 358/29 C

FOREIGN PATENT DOCUMENTS 57-13878 1/1982 Japan ............................... 358/29 C
57-5494 1/1982 Japan ............................... 358/29 C Primary Examiner—Michael A. Masinick
Attorney, Agent, or Firm—Toren, McGeady & Associates

[57] ABSTRACT

An image sensing apparatus performs either follow-up type color balance adjustment in which a color balance is adjusted according to the color component ratio of the external light and setting type white balance adjustment in which a color balance is adjusted according to the chrominance signal component ratio of an image pick-up signal. The apparatus is capable of always adequently carrying out color balance by switching the two types of balance adjustment functions from one over to the other in conformity with any of varied conditions.

23 Claims, 15 Drawing Sheets

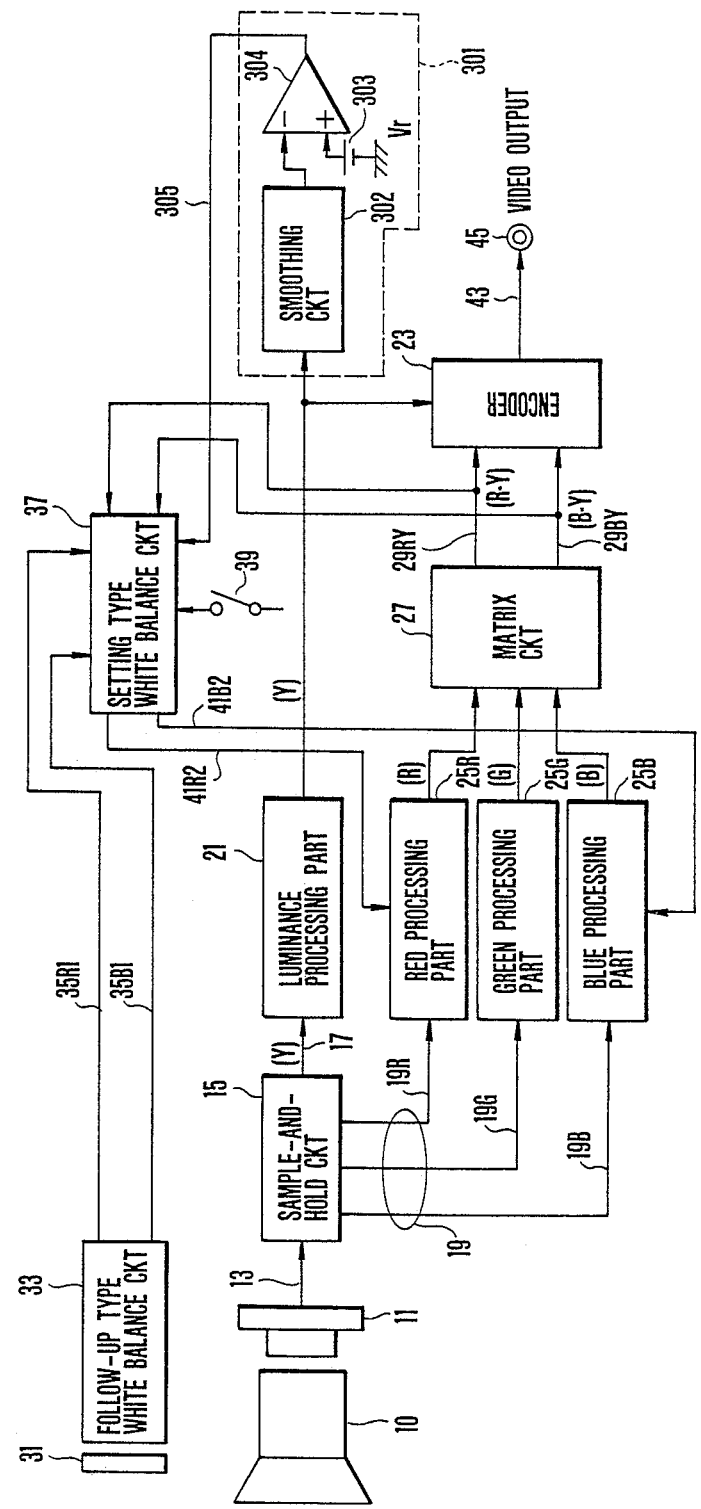
F I G. 5

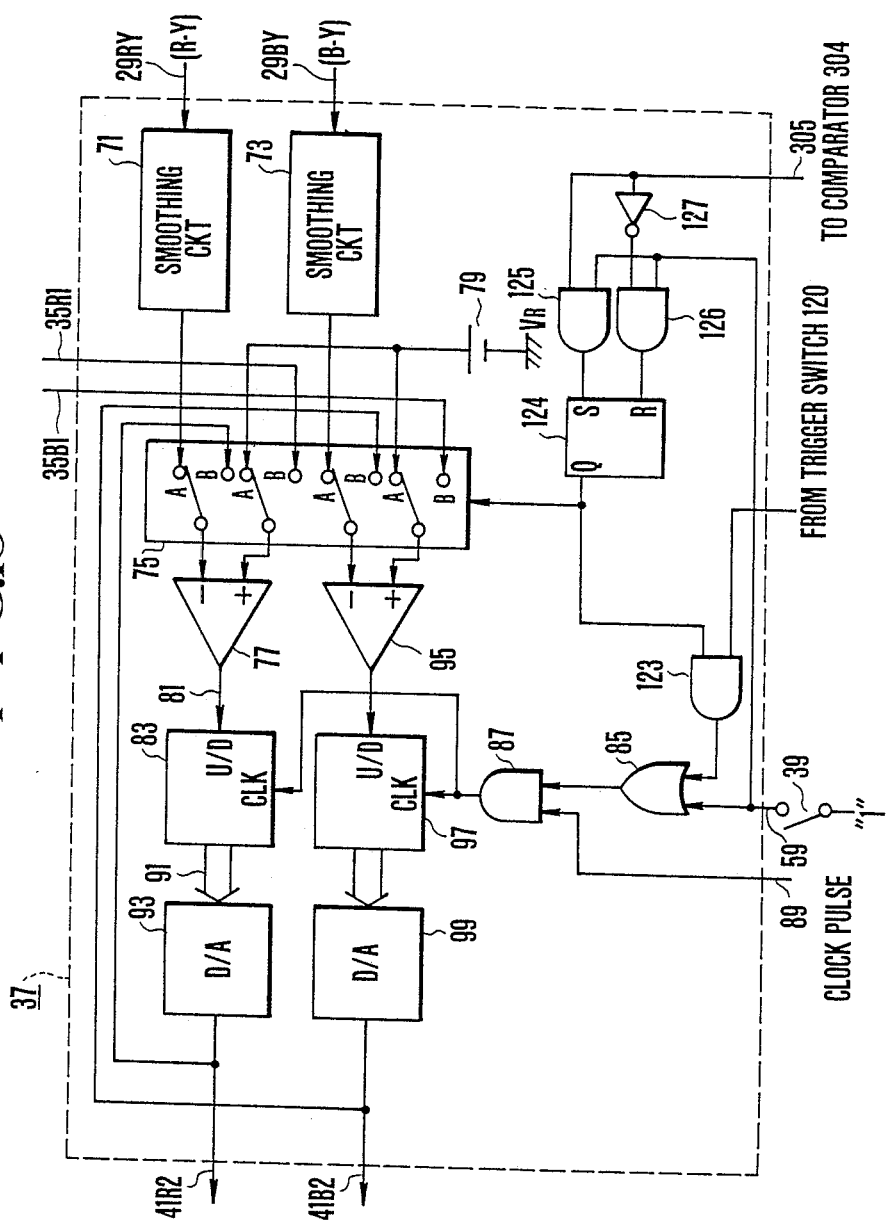
F I G. 10

IMAGE SENSING APPARATUS

This is a continuation of application Ser. No. 828,961, filed Feb. 12, 1986, now abandoned.

BACKGROUND OF THE INVENTION

1. Field of the Invention

This invention relates to an image sensing apparatus having a follow-up type color balance adjusting function whereby a color balance control condition is adjusted following changes in the color component ratio of the external light and a setting type color balance adjusting function whereby the color balance adjustment is controlled according to a preset state obtained by presetting a color balance control condition.

2. Description of the Prior Art

The basic operations of the television cameras includes a color balance adjusting operation called white balancing. This operation is arranged to control the red (R), green (G) and blue (B) color signals included in an image pick-up signal representing a white object to bring them into a ratio of 1:1:1 to each other. Theoretically, the white balance can be obtained by photographing a white object and by adjusting the gains of red (R) and blue (B) signals during a color system processing operation to bring, for example, each of the two color difference signals R−Y and B−Y of red and blue systems to a zero level. Heretofore, varied kinds of automatic white balance adjustment devices which automatically perform white balance adjustment have been proposed for house hold or industrial television cameras, because these cameras must meet the following requirements.

1. The operation by the operator on the device is either simple or not required at all.
2. No great image deterioration results from an error in the operation on inadvertent ommission of the operation.
3. White balance must be adequately attained even under the conditions 1 and 2 above.

To meet these requirements, there have been proposed automatic white balance adjusting functions which can be classified roughly into the following two types:

(1) Follow-up type white balance adjusting function
   White balance is adjusted by utilizing the color component ratio within the external light in addition to the photo-taking light of the television camera. This normally requires no operation by the photographer.
(2) Setting type white balance adjusting function: White balance is adjusted according to the chrominance signal ratio in the image pick-up signal of the television camera. This function is generally performed while a switch is pushed by the photographer.

The follow-up type white balance adjusting function mentioned in paragraph (1) above is performed by an open-loop control system controlling an image pick-up signal on the basis of information other than the image pick-up signal. In order to attain sufficiently accurate white balance adjustment by this system, the degree of error of each part of the system must be minimized. This requirement for increased precision of each part then results in a complex system arrangement. This is a drawback of the follow-up type function.

In the case of the setting type white balance adjusting function, the levels of the color difference signals R−Y and B−Y are set by feedback control to become a zero level respectively. They are then arranged to be kept in that state in a digital or analog manner. In other words, the setting type function is performed by a closed loop control system. Even if there is some error element within the system, white balance is accurately adjustable so long as the system is stable in terms of aging and temperature. However, the setting type system necessitates a manual pushing operation on a setting switch for picking up an image of a white object. In this case, while the white balance adjusting accuracy after the setting operation is ensured as mentioned above, the system does not ensure the accuracy before setting. To solve this problem, the following contrivances have been attempted:

(a) Setting at a suitable preset value when a power supply is switched on.
(b) Holding the preset value even after the power supply is switched off.

However, such arrangement still does not sufficiently ensure accurate white balance adjustment against the above-stated inadvertent omission of the setting operation.

SUMMARY OF THE INVENTION:

It is a first object of this invention to provide an image sensing apparatus which is capable of eliminating the above-stated shortcomings of the prior art.

It is second object of this invention to provide an image sensing apparatus which ensures no salient deterioration of images in the event of an erroneous operation or inadvertent omission of the operation.

To attain these objects, an image sensing apparatus arranged according to this invention as an embodiment thereof is provided with both the follow-up type white balance adjusting function and the setting type white balance adjusting function. The follow-up white balance adjusting function is arranged to be performed when a power supply is switched on. Then, the follow-up type white balance adjusting function is automatically shifted to the setting type white balance adjusting function in accordance with a manual operation performed by the operator of the apparatus.

It is a third object of this invention to provide an image sensing apparatus which has both the follow-up white balance adjusting function and the setting type white balance adjusting function and is capable of adequately effecting change-over between the two functions.

To attain this object, an image sensing apparatus arranged as another embodiment of this invention includes an arrangement which stops the follow-up type white balance adjusting function and switches it over to the setting type white balance adjusting function when the color temperature of the object to be photographed comes to exceed the adjustable range of the follow-up type function during the white balance adjusting process performed by the follow-up type white balance adjusting function.

These and further objects and features of this invention will become apparent from the following detailed description of embodiments thereof taken in connection with the accompanying drawings.

BRIEF DESCRIPTION OF THE DRAWINGS

FIG. 5 is a block diagram showing an image sensing apparatus arranged as a modification of the first embodiment.

FIGS. 6 to 10 show a second embodiment of this invention in a manner similar to FIGS. 1 to 5.

DETAILED DESCRIPTION OF THE PREFERRED EMBODIMENTS

Figure 1:
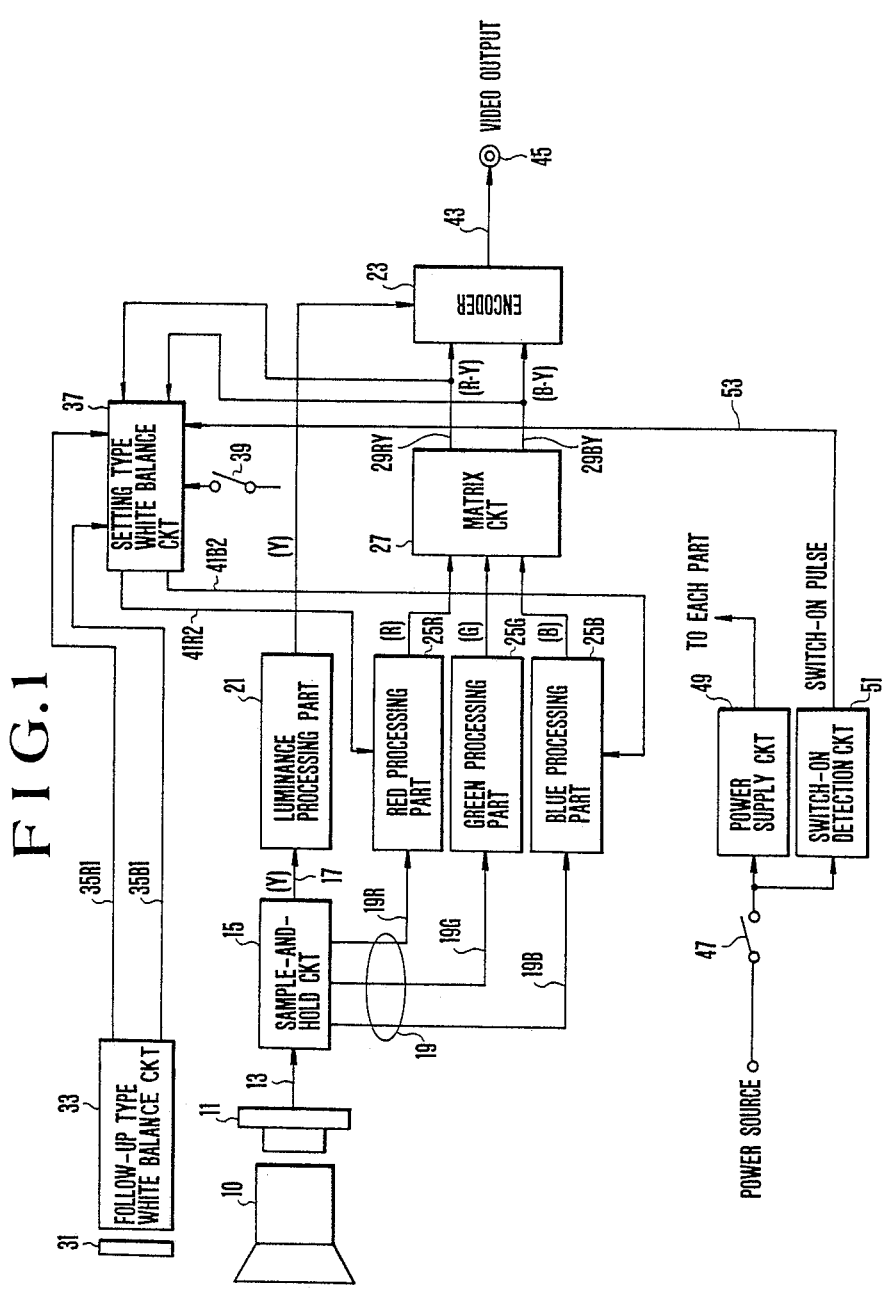
FIG. 1 is a block diagram showing an image sensing apparatus arranged according to this invention as a first embodiment thereof.

The details of this invention are as described below with reference to the accompanying drawings:

FIG. 1 shows an image sensing apparatus arranged as a first embodiment of this invention. Referring to FIG. 1, the illustration includes an optical system 10 which is composed of a photo-taking lens, a crystal filter and an infrared filter and is arranged to form an image of the object to be photographed on an image sensor 11. The image sensor 11 produces an image pick-up signal 13 in the form of an electrical signal. The image pick-up signal 13 is seriated by a sample-and-hold circuit 15 and is, at the same time, divided into a luminance (Y) signal 17 and three color signals 19 including a red color signal 19R, a green color signal 19G and a blue color signal 19B. The luminance signal 17 is processed by a luminance processing part 21 and is then supplied to an encoder 23. The red color signal 19R, the green color signal 19G and the blue color signal 19B are processed respectively by a red color processing part 25R, a green color processing part 25G and a blue color processing part 25B and are then supplied to a matrix circuit 27. The matrix circuit 27 then supplies an encoder 23 with two color difference signals 29RY and 28BY which respectively represent color differences (R−Y) and (B−Y).

A setting type white balance circuit 37 is arranged to supply two white balance signals 41R2 and 41B2 to the red color processing part 25R and the blue color processing part 25B and to adjust white balance by controlling the gains or these processing parts 25R and 25B. The encoder 23 is arranged to combine the signals obtained from the luminance processing part 21 and the matrix circuit 27 and synchronizing signals (which are not shown) into a television signal. The television signal thus The two color difference signals 29RY and 29BY are also supplied to the setting type white balance circuit 37. When a switch 39 is turned on by a pushing operation thereon, the setting type white balance circuit 37 produces two white balance signals 41R2 and 41B2 in such a manner as to cause the levels of the introduced color difference signals 29RY and 29BY to become a zero level respectively. The circuit 37 thus performs a white balance setting operation. After the switch 39 is turned off, the set output values of the two white balance signals 41R2 and 41B2 are kept unchanged.

A power supply switch 47 is arranged to connect and disconnect a power supply circuit 49 to and from a power source which is not shown. The power supply circuit 49 is arranged to generate a voltage required for a signal processing circuit, an image sensor driving circuit which is not shown, a synchronizing circuit and other internal circuits disposed within the camera (image sensing apparatus). A switch-on detection circuit 51 is arranged to detect the switching-on of the power supply and to apply a pulse signal 53 of a given width to the setting type white balance circuit 37.

A diffusion plate 31 is arranged to allow a color sensor which is not shown but is disposed within the follow-up type white balance circuit 33 to have a wide range of external light incident thereon. The follow-up type white balance circuit 33 detects the color component ratio of the external light from this incident light. The circuit 33 then generates two follow-up type white balance signals 35R1 and 35B1 for red and blue colors. These signals 35R1 and 35B1 are supplied to the setting type white balance circuit 37. After the switch 39 is turned on, the setting type white balance circuit 37 performs a normal setting type white balance adjusting operation as mentioned in the foregoing. When the power supply is switched on, the setting type white balance circuit 37 receives the switch-on pulse 53 from the switch-on detection circuit 51 and operates in such a manner that the voltages of the two white balance signals 41R2 and 41B2 for the red and blue colors become respectively equal to those of the two follow-up type white balance signals 35R1 and 35B1.

Figure 2:
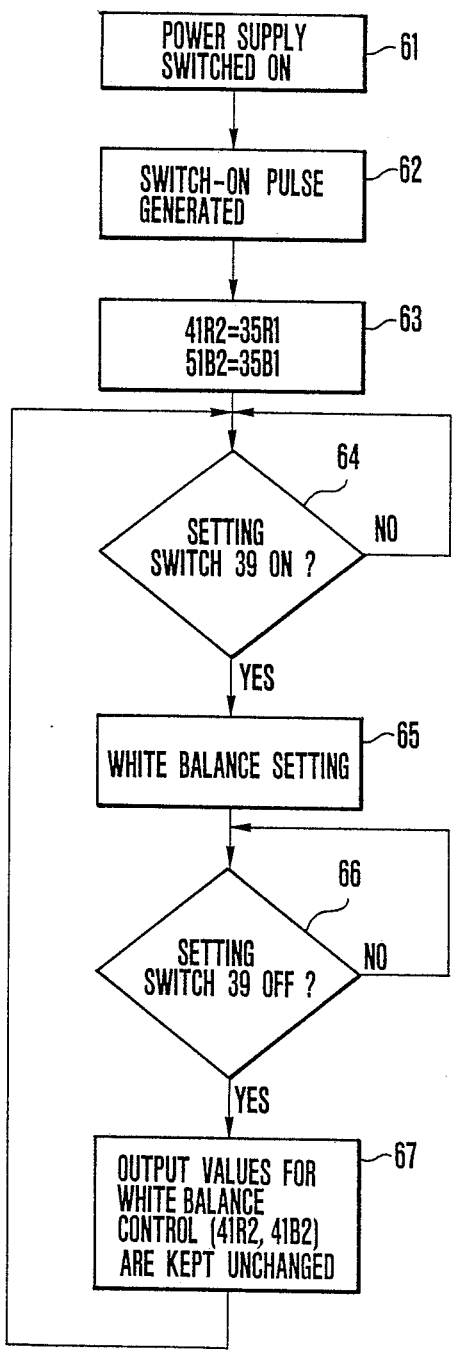
FIG. 2 is a flow chart showing a white balance control operation performed by the first embodiment.

FIG. 2 shows in a flow chart the above-stated operation of the first embodiment. When the power supply is switched on (at a step 61), the switch-on detection circuit 51 generates the switch-on pulse 53 (at a step 62). The two white balance signals 41R2 and 41B2 are set at the same voltages as those of two follow-up white balance signals 35R1 and 35B1 respectively (at a step 63). After that, this state is kept unchanged until the setting switch 39 turns on (at a step 64). With the setting switch 39 turned on, the result of check-up made at the step 64 becomes affirmative. Then, the operation shifts to the normal setting-type white balance adjusting operation to bring each of the color difference signals (R−Y) and (B−Y) to a zero level (at a step 65). The normal white balance adjusting operation continues until the switch 39 turns off (at a step 66). With the switch 39 having turned off, the result of check-up made at the step 66 becomes affirmative. The output values of the two white balance signals 41R2 and 41B2 are then kept unchanged (at a step 67). The operation flow comes back to the step 64.

The setting type white balance circuit 37 can be readily arranged by a digital method, an analog method or a soft programing method for a microcomputer or the like. An example of use of the digital method is as shown in FIG. 3.

Figure 3:
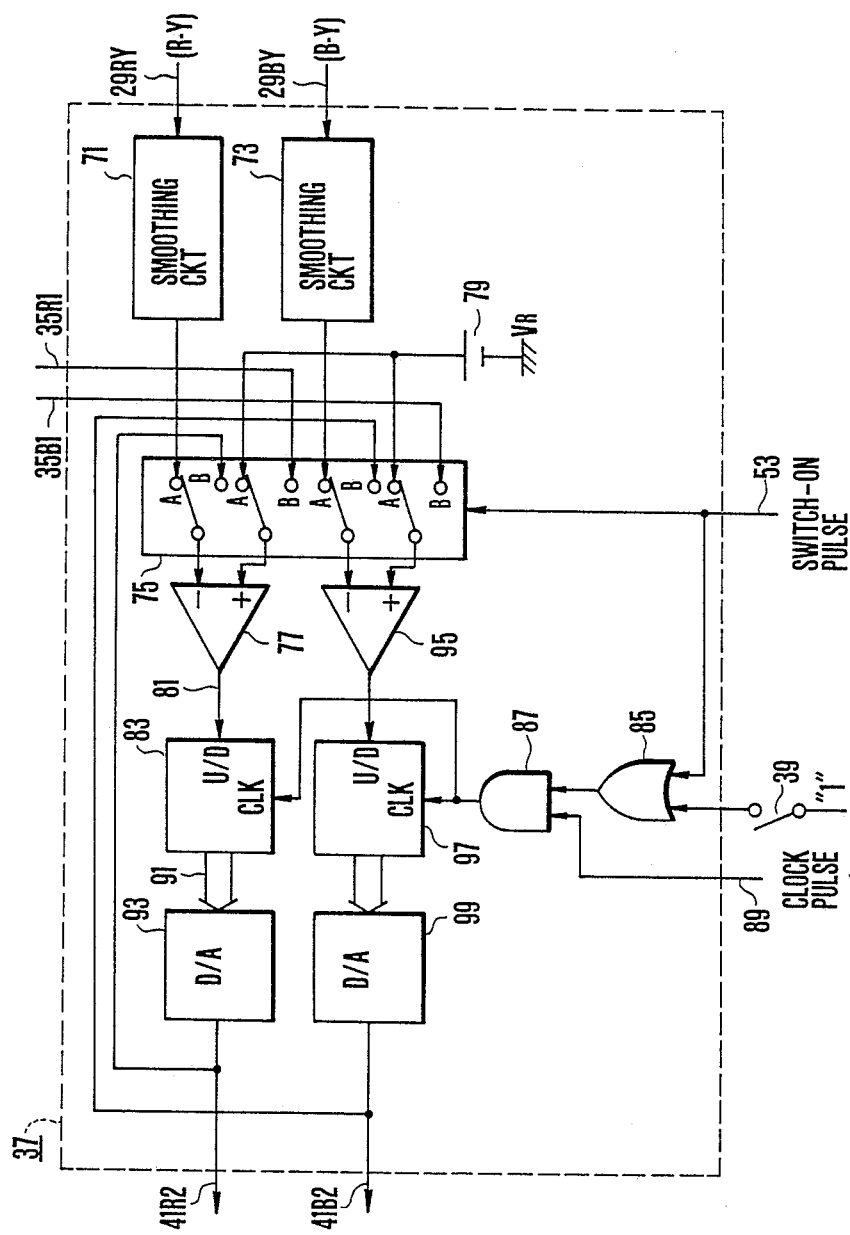
FIG. 3 is a circuit diagram showing by way of example the details of a setting type white balance adjustment circuit employed in the first embodiment.

Referring to FIG. 3, the illustration includes two smoothing circuits 71 and 73, which are arranged to smoothen the incoming color difference signals 29RY and 29BY. A switch circuit 75 in the next stage includes four change-over switches. Each of these switches is connected to one terminal A thereof while the switch-on pulse 53 is not supplied to them. Therefore, after having been smoothened by the smoothing circuit 71, the color difference signal 29RY is supplied via the switch circuit 75 to the inversion input terminal of a comparator 77, which is one of two comparators. Meanwhile, to the non-inversion input terminal of this comparator 77 is supplied, via the switch circuit 75, a reference voltage VR from a DC power source 79. The comparator 77, therefore, produces a logical signal indicative of "0" when the voltage level of the smoothened color difference signal 29RY is higher than that of the reference voltage VR and indicative of "1" when the former is lower than the latter. This output is supplied to an up-down counter 83 as an up-down control signal 81. The counter 83 receives it at its addition-subtraction change-over input terminal U/D. When the switch 39 is turned on, one of the inputs of an AND gate 87 is caused to become the logical value "1" via an OR gate 85. As a result, a clock signal 89 which is supplied from a synchronizing circuit (not shown) is supplied to the clock input terminal CLK of the up-down counter 83. Then, the counter 83 begins to perform either adding count or subtracting count according to the addition-subtraction change-over input. A signal 91 which is the output of this up-down counter 83 is supplied to a digital-to-analog (D/A) converter 93. The D/A converter 93 then generates, according to the data produced from the counter 83, a white balance signal 41R2 which is to be used for red color gain control. The white balance signal 41R2 is supplied to the red color processing part 25R and thus controls the gain of the red color signal Such being the circuit arrangement, the up-down counter 83 keeps on operating as long as the switch 39 is pushed. When the output of the smoothing circuit 71 becomes approximately equal to the reference voltage VR, the output of the comparator 77 is inverted by every clock pulse and the setting operation comes to an end. After that, when the switch 39 is released from the pushing operation thereon, or turned off, the operation of the up-down counter 83 comes to a stop retaining its count value last obtained.

When the switch-on pulse 53 becomes "1", all the change-over switches of the switch circuit 75 are connected to their terminals B. As a result, the comparator 77 receives the follow-up type white balance signal 35R1 from the follow-up type white balance circuit 33 at its non-inversion input terminal and the output of the D/A converter 93 at its inversion input terminal respectively.

The switch-onpulse 53 is applied to the other input terminal of the AND gate 87 via the OR gate 85. This allows the clock signal 89 to be supplied to the clock input terminal CLK of the up-down counter 83 to cause the counter 83 to operate. The output of the comparator 77 comes to be inverted by every clock pulse as mentioned above when the output of the D/A converter 93 becomes about equal to the follow-up type white balance signal 35R1. The operation of the counter 83 comes to a stop when the switch-on pulse 53 becomes "0". In other words, the circuit arrangement of the embodiment is arranged to cause the voltage of the follow-up type white balance signal 35R1 produced from the follow-up type white balance circuit 33 and that of the white balance signal 41R2 produced from the setting type white balance circuit 37 to become equal to each other. While the above description covers only the R signal system, another comparator 95, another up-down counter 97 and another D/A converter 99 are arranged to operate also in the same manner for the B signal system.

Figure 4:
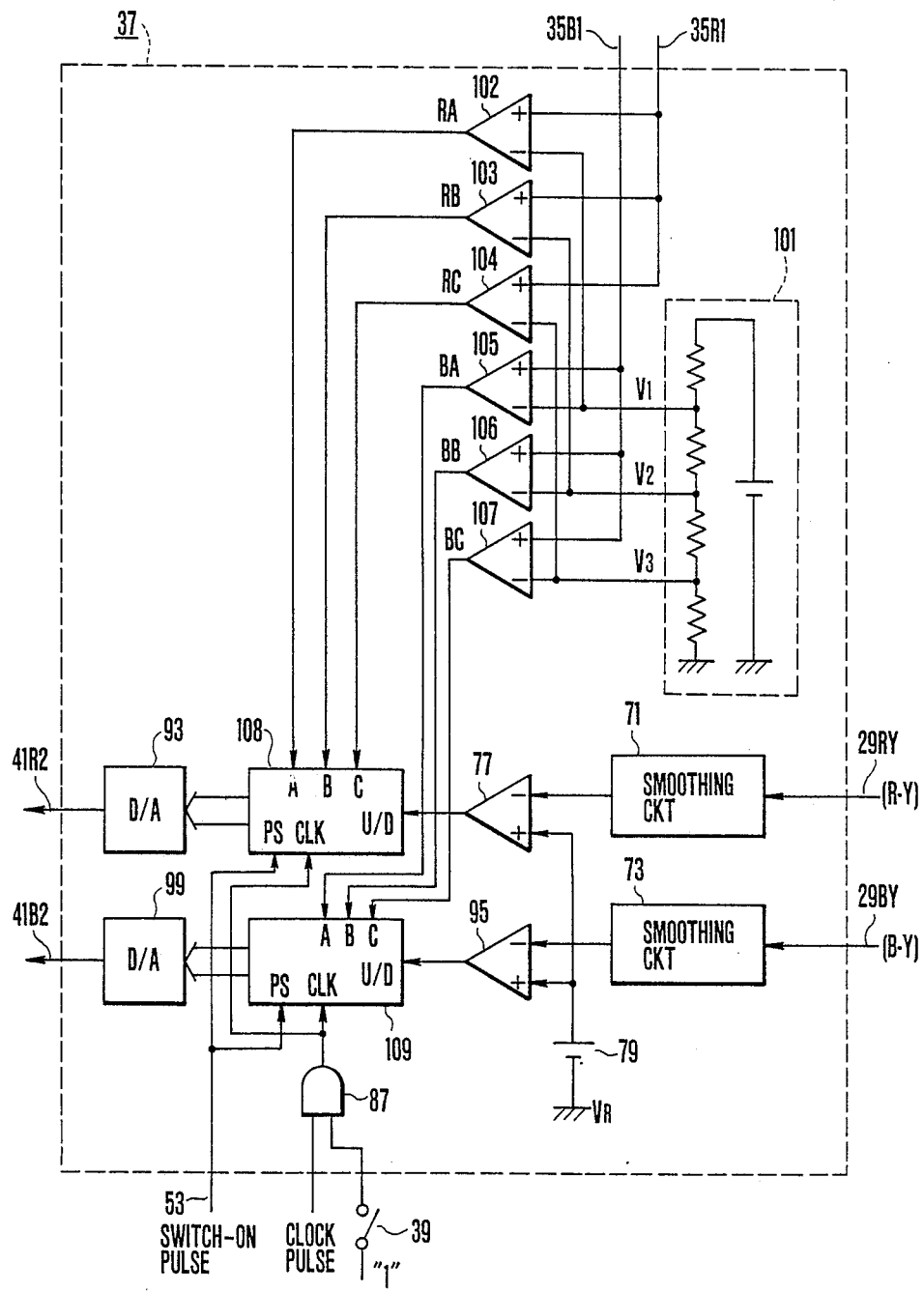
FIG. 4 is a circuit diagram showing another example of the details of the setting type white balance adjustment circuit.

Another example of arrangement of the setting type white balance circuit 37 is as shown in FIG. 4. In this case, the circuit 37 is provided with elements different from those of FIG. 3 including a reference voltage source 101, six comparators 102 to 107 and up-down counters 108 and 109 which are provided with preset arrangement.

When the switch-on pulse 53 is at "0", the setting type white balance circuit operates to make the color difference signals zero while the switch 39 is ON in the same manner as in the case of FIG. 3. Therefore, the operation to be performed in that instance requires no description. Meanwhile, in case that the switch-on pulse 53 is at "1", the circuit 37 operate as described below:

The reference voltage source 101 and the comparators 102 to 107 jointly form a sort of analog-to-digital (A/D) converter part. More specifically, according to the magnitudes of the incoming follow-up type white balance signals 35R1 and 35B1 in relation to those of divided voltages V1, V2 and V3 produced from the reference voltage source 101, preset data RA, RB and RC (an R signal system) and preset data BA, BB and BC (a B signal system) are supplied to the up-down counters 108 and 109 which are provided with preset arrangement. Therefore, when the switch-on pulse 53 becomes "1", the up-down counters 108 and 109 selectively produce some of data stored therein according to these preset data RA, RB, RC, BA, BB and BC. The A/D converter part of the R signal system which is composed of the reference voltage source 101 and three comparators 102, 103 and 104 has low resolution including four steps. Therefore, the follow-up type white balance signal 35R1 and the white balance signal 41R2 never come to coincide perfectly with each other. However, one of the preset data which is the nearest among them is selected. In the B signal system, the comparators 105, 106 and 107 and the up-down counter 109 also operate in a similar manner. It goes without saying that the resolution can be increased by increasing the number of comparators.

In carrying out the setting type color balance adjusting function, if the luminance of the object to be photographed is low, the output of the image sensor 11 is insufficient or, even if it is sufficient, the S/N ratio thereof decreases. It has been, therefore, difficult to set color balance under such a condition. However, another embodiment (or a modification of the first embodiment) which is capable of solving this problem is arranged as shown in FIG. 5. In FIG. 5, the same reference numerals and symbols as those used in FIG. 1 are used in indicating the same circuit elements or elements corresponding to those of FIG. 1. This modification example differs from the first embodiment in that a low luminance detection circuit 301 is added to the latter. In cases where the luminance of the object is sufficiently high, the smoothened output of a smoothing circuit 302 which is arranged to smoothen a signal (Y) produced from the luminance processing part 21 is higher than a reference voltage Vr produced from a reference voltage source 303. As a result, a signal 305 which is produced from a comparator 304 is at "0". In this instance, the setting type white balance circuit 37 operates in a normal manner. In other words, while the switch 39 is pushed, the white balance signals 41R2 and 41B2 are controlled to bring the color difference signals 29RY and 29BY to a zero level. The voltages thus obtained are kept unchanged after the switch 39 is freed from the pushing operation thereon.

Whereas, there are occasions where white balance setting can be hardly carried out due to excessively low luminance of the object as mentioned above. In that instance, the output of the smoothing circuit 302 becomes lower than the reference voltage Vr. The signal 305 produced from the comparator 304 then becomes "1". In response to this, the connecting position of the switch circuit 75 shown in FIG. 3 is shifted to the terminal B. Then, the white balance signals 41R2 and 41B2 are set at voltage values which are either the same as or closed to the follow-up type white balance signals 35R1 and 35B1. Then, white balance adjustment is performed by the gain control operation as described in the foregoing with reference to FIG. 1.

In the case of the modification example of FIG. 5, the voltage signals for white balance control are arranged to be set at the same values as the voltages produced from the follow-up type white balance circuit in the event of low luminance. This arrangement may be replaced with some different arrangement that is arranged to detect an abnormal setting operation, such as an overflow of the up-down counter, shortness of the length of time for which the setting switch is pushed, etc.

The output of the follow-up type white balance circuit 33 is used only for controlling the setting type white balance circuit 37. However, a change-over switch may be arranged to permit use of either the output of the setting type white balance circuit 37 or that of the follow-up type white balance circuit 33 as the gain control signal to be applied to the color signal processing circuit. Further, the processes of detecting that the power supply is switched on, detecting low luminance, detecting the overflow, etc. may be arranged in a combination as desired.

Figure 6:
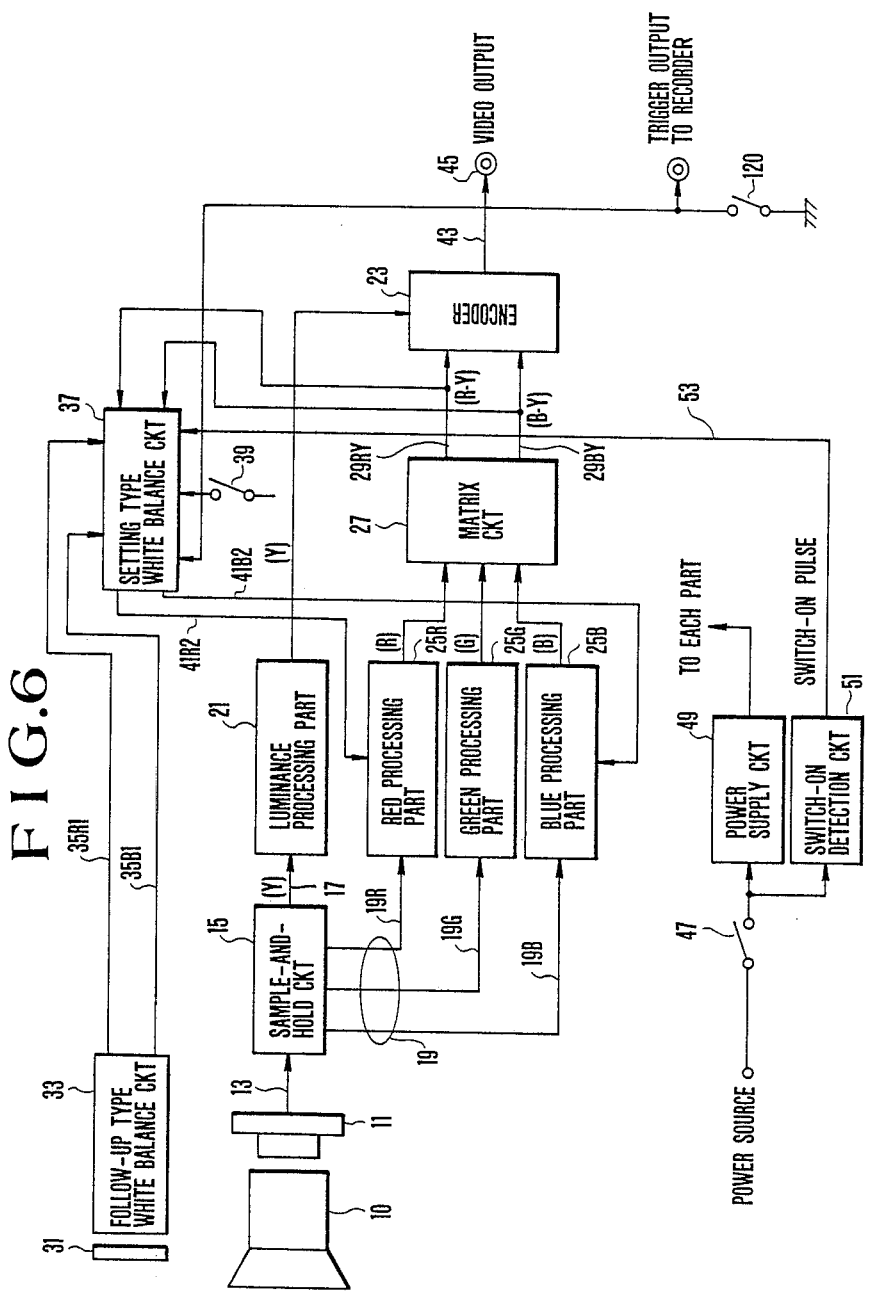

Next, with the image sensing apparatus which is provided with both the above-stated follow-up type color balance adjusting function and the setting type color balance adjusting function combined with a recording device for recording the video output of the image sensing apparatus, an embodiment which performs a switch-over operation between these two functions is arranged as shown in FIGS. 6 to 10. These drawings are similar to FIGS. 1 to 5 and use the same reference numerals and symbols for indicating the same or similar elements. These same elements are omitted from the following description: Referring to FIG. 6 which shows the apparatus as a second embodiment of this invention, this embodiment differs from the embodiment of FIG. 1 in that the former is provided with a trigger switch 120. The image sensing apparatus is connected to a recording device which is not shown but is arranged to record a signal produced from a video signal output terminal according to a signal produced from a trigger output terminal. Further, the recording device is arranged to record the video output when the trigger switch 120 is turned on. The signal produced from the trigger switch 120 is supplied to the setting type white balance circuit 37. With the embodiment arranged in this manner, it operates in the following manner:

After the power supply is switched on by the power supply switch 47, when the switch 39 is turned on, the above-stated normal operation is carried out. In other words, the white balance signals 41R2 and 41B2 are variable while the switch 39 is on and the operation is performed to have both the input signals R−Y and B−Y become zero. Then, when the switch 39 is turned off, the state obtained at that time is retained. Further, with the power supply switched on, if the trigger switch 120 is not turned on before the switch 39 is turned on, the outputs 35R1 and 35B1 of the follow-up type white balance circuit 33 are supplied to the processing parts 25R and 25B. Then, when the trigger switch 120 is turned on, the embodiment operates to retain the outputs 35R1 and 35B1 of the follow-up type white balance circuit 33 obtained immediately before the trigger switch is turned on.

Figure 7:
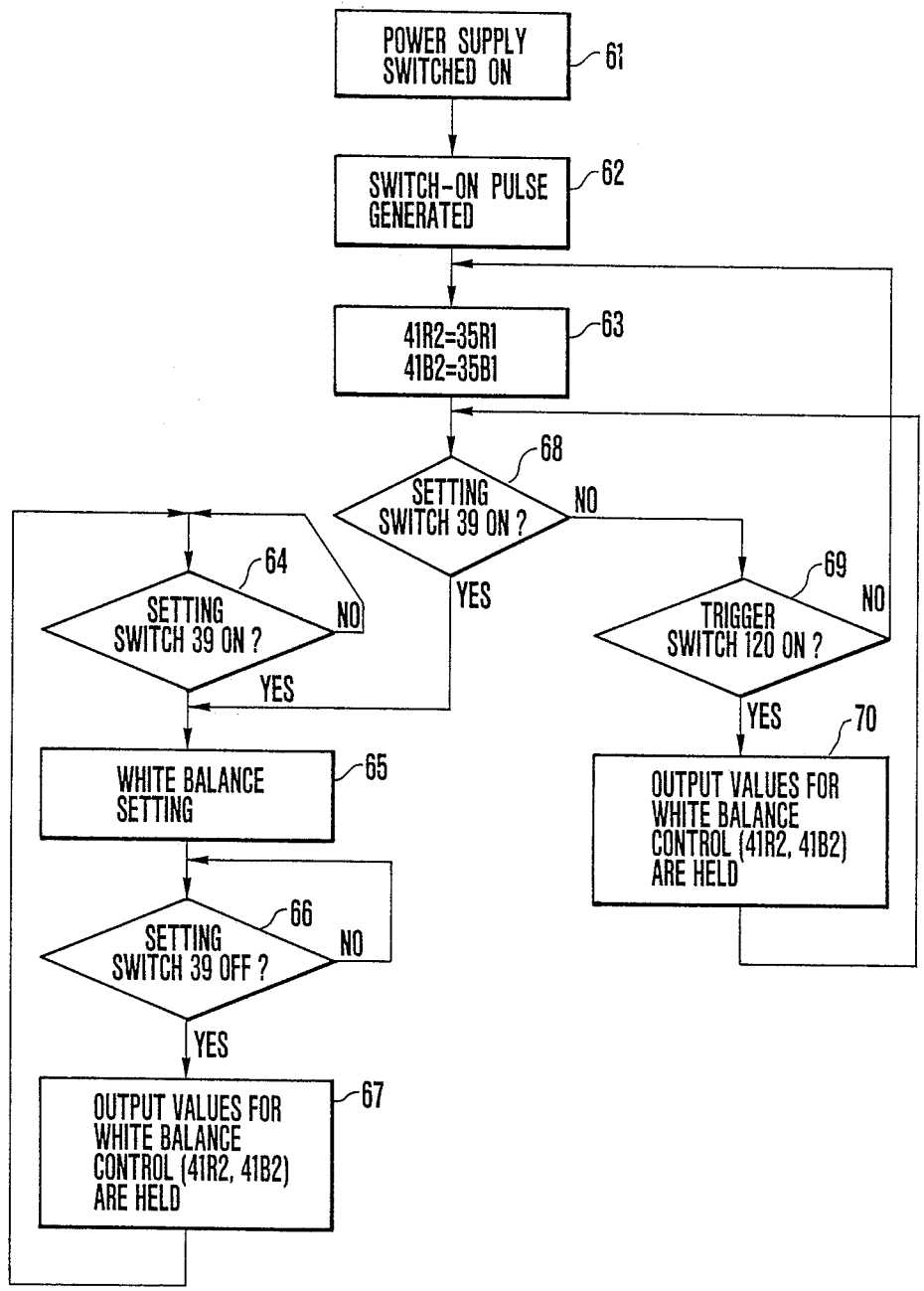

FIG. 7 shows this operation of the embodiment in a flow chart. In FIG. 7, the steps which are similar to those shown in FIG. 2 are numbered likewise and are omitted from the description here. When the setting switch 39 is ON after the power supply is switched on, the flow of operation branches out to a step 64 after the steps 61, 62, 63 and 68 and the embodiment operates in the same manner as in FIG. 2. In case that the setting switch 39 is off after the power supply is switched on, the flow branches out to a step 69 after the steps 61, 62, 63 and 68. At the step 69, the trigger switch 120 is checked to see if it is ON. If the switch 120 is not found ON, the flow of operation comes back to the step 63. The embodiment, then operates to equalize the white balance signals 41R2 and 41B2 to the outputs 35R1 and 35B1 of the follow-up white balance circuit 33 respectively. In this instance, when the trigger switch 120 is turned ON, values obtained immediately before a step 70 is kept unchanged at the step 70.

The flow of operation shown in FIG. 7 can be arranged to be carried out under the control of a software of a micro-computer other like. An example where the setting type white balance circuit is formed by a hardware without using a micro-computer is arranged as shown in FIG. 8.

Figure 8:
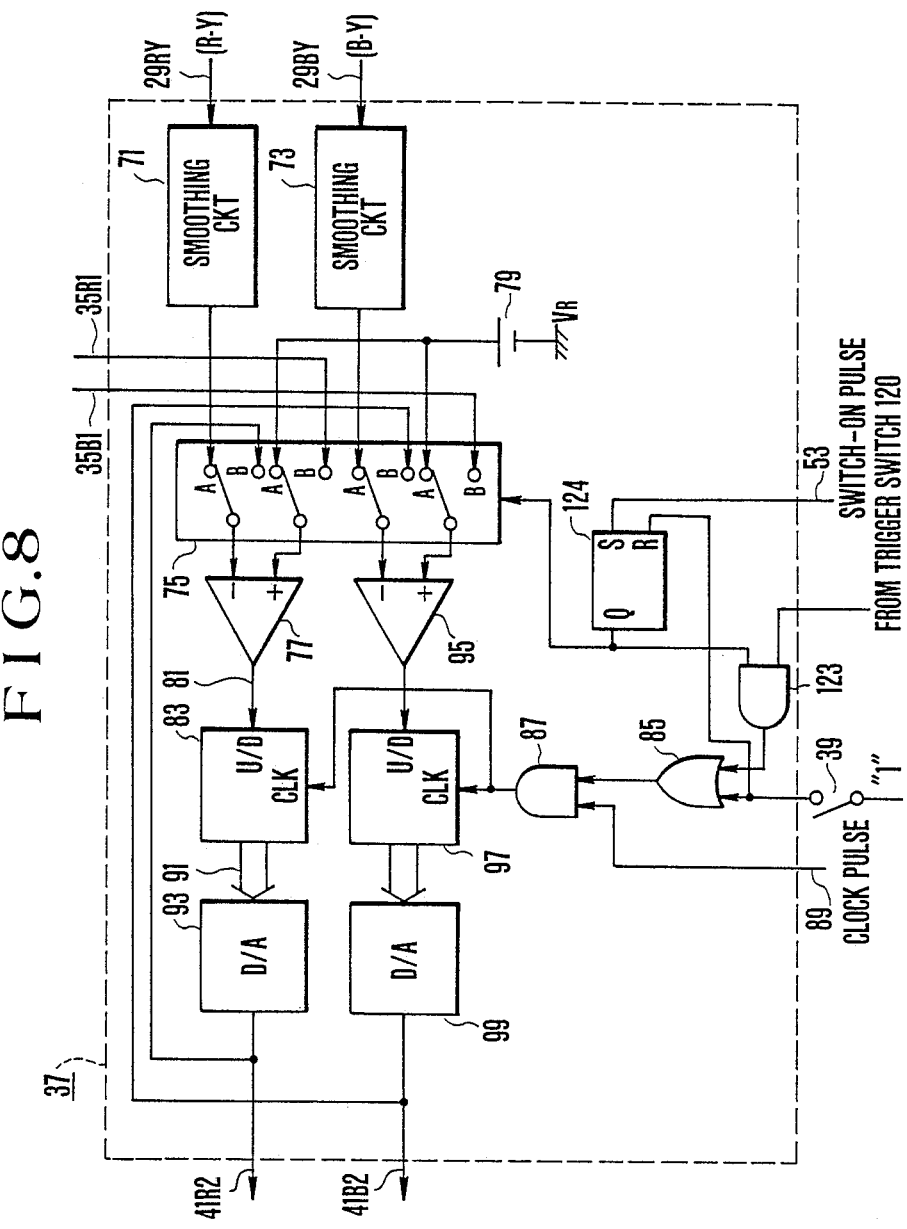

FIG. 8 is a block diagram similar to FIG. 3. In FIG. 8, a reference numeral 123 denotes an AND gate. An RS flip-flop 124 is arranged to receive a pulse signal 53 at a set input terminal S thereof and a signal from the switch 39 at a reset input terminal R. An AND gate 123 is arranged to obtain the AND of the output Q of the RS flip-flop 124 and the output of the trigger switch 120. The operation:

When a switch-on pulse 53 is generated with the power supply switched on, the RS flip-flop 124 is set and the Q output thereof becomes "1". Therefore, all the switches of the switch circuit 75 are connected to their terminals B. Then, as mentioned in the foregoing, the follow-up type white balance signals 35R1 and 35B1 from the follow-up type white balance circuit 33 are supplied to comparators 77 and 95. The white balance is thus adjusted by the outputs of the circuit 33.

Then, with the trigger switch 120 turned on one of the inputs of the AND gate 123 becomes "0". The up-down counters 83 and 97 no longer receives clock pulses 89. These counters 83 and 97 retain the data obtained at that time.

Further, when the setting switch 39 is turned on by the operator, the RS flip-flop 124 is reset and the Q output thereof changes to "0". Accordingly, all the switches of the switch circuit 75 shift their positions to their terminals A. Two color difference signals 29RY and 29BY from the matrix circuit 27 are supplied to the comparators 77 and 95. The white balance is thus adjusted using these color difference signals 29RY and 29BY. When the setting switch 39 is turned off by the operator, the output of the OR gate 85 becomes "0" and that of the AND gate 87 also becomes "0". The clock pulses cease to be supplied to the counters 83 and 97. The counters 83 and 97 then retain their data. Setting type white balance adjustment is thus performed.

Figure 9:
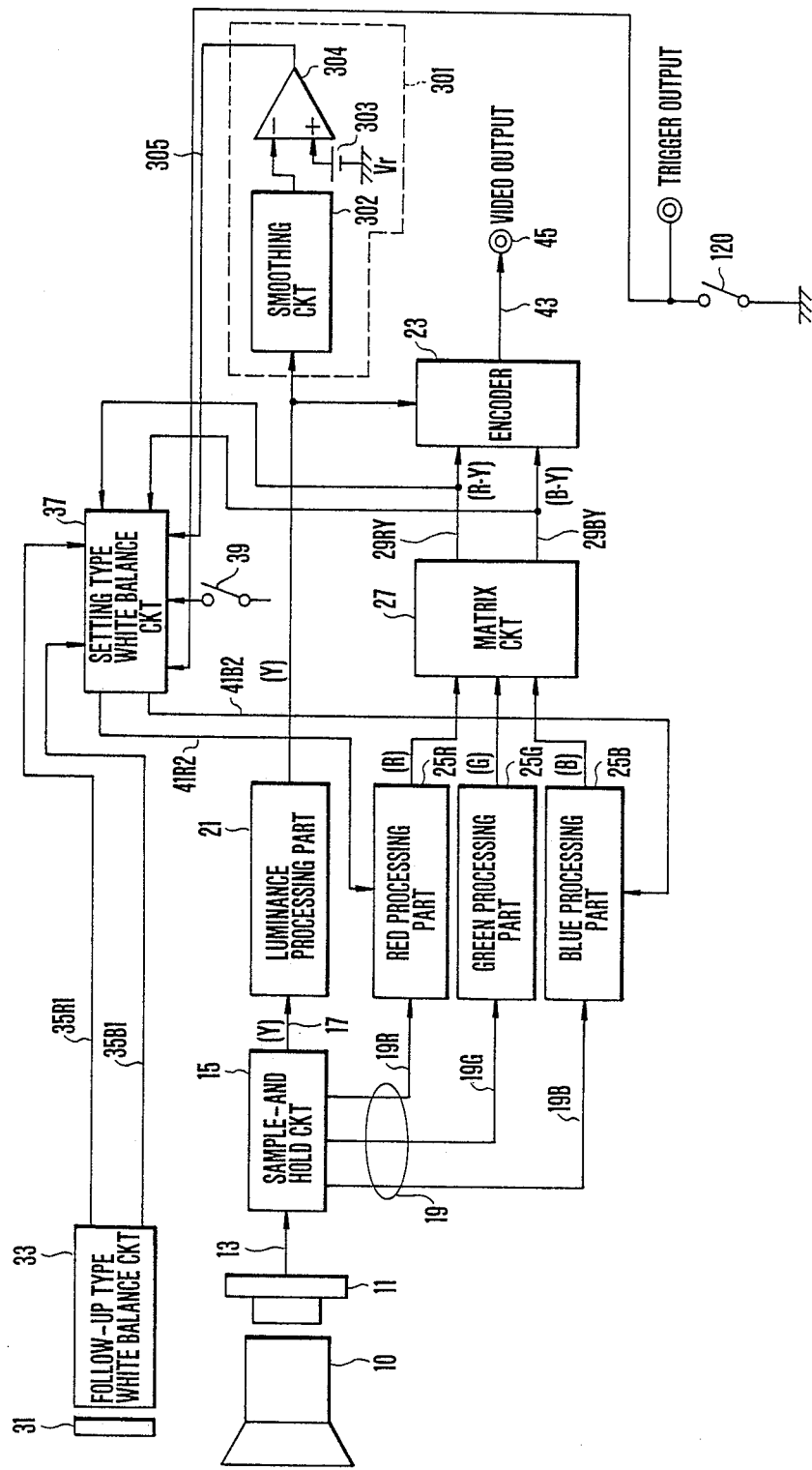

FIG. 9 is a block diagram similar to FIG. 5. The apparatus of FIG. 9, like that of FIG. 6, differs from the apparatus of FIG. 5 in respect of an additional provision of a trigger switch 120. FIG. 10 is a circuit diagram showing the arrangement of the setting type white balance circuit 37 included in the apparatus of FIG. 9. The circuit 37 of FIG. 10 differs from the circuit 37 of FIG. 8 in respect of an additional provision of AND gates 125 and 126 and an inverter 127. The operation:

In case that the luminance of the object is sufficient, the low luminance signal 305 is at "0" and the RS flip-flop 124 is not set. Therefore, a normal setting type white balance adjusting operation is performed. Whereas, in the event of a low luminance of the object, if the setting switch 39 is turned on while the low luminance signal 305 is at "1", a signal which sets the RS flip-flop 124 is produced from the AND gate 125. The RS flip-flop 124 is set by the signal. The Q output of the RS flip-flop (hereinafter referred to as RS—FF) becomes "1". Then, the connecting position of the switch circuit 75 shifts to the terminal B. Under this condition, if no recording is performed by the recording device which is not shown, the trigger switch 120 is not in its ON state and is off. Therefore, the white balance signals 41R2 and 41B2 are adjusted to become equal to the signals 35R1 and 35B1 produced from the follow-up type white balance circuit 33. When the trigger switch 120 is turned on, the output of the AND gate 123 becomes "0". Then, the counters 83 and 97 hold the data obtained immediately before the switch 120 is turned on.

Further, the RS—FF 124 remains in its set state even when the setting switch 39 is turned on. The connecting position of the switch circuit 75 does not shift to the terminal A. The outputs from the follow-up type white balance circuit 33 are held in the same manner as mentioned in the foregoing. Then, the white balance adjustment is never set on the basis of the color difference signals (R−Y) and (B−Y). After that, when the luminance of the object increases, the low luminance signal 305 becomes "0". Then, when the setting switch 39 is turned on under that condition, the AND gate 126 produces an output at "1". The Q output of the RS—FF 124 also becomes "0". The connecting position of the switch circuit 75 shifts to the terminal A. A normal setting type white balance adjusting operation is performed.

In the embodiment described which is a system including the recording device in combination with an image sensing apparatus having both the follow-up type white balance adjusting function and the setting type white balance adjusting function, the follow-up type white balance adjusting function is performed during a period after the power supply is switched on and before either the trigger switch 120 which causes the recording device to perform recording or the setting switch 39 is turned on. After that, if the trigger switch 120 is turned on, the follow-up type white balance adjusted state obtained immediately before that is retained. Further, in case that the setting switch 39 is turned on, the white balance adjustment is set on the basis of the output of the image sensor 11 obtained when the switch 39 is turned on.

Further, in the case of the embodiment shown in FIG. 10, if the setting type white balance adjustment cannot be accurately accomplished because of excessively low luminance of the object, the setting type white balance adjustment on the basis of the color difference signals (R−Y) and (B−Y) is not performed even if the setting switch 39 is turned on. In that event, the output obtained by the follow-up type white balance adjustment is retained to ensure adequate white balance adjustment thereby.

Figure 11:
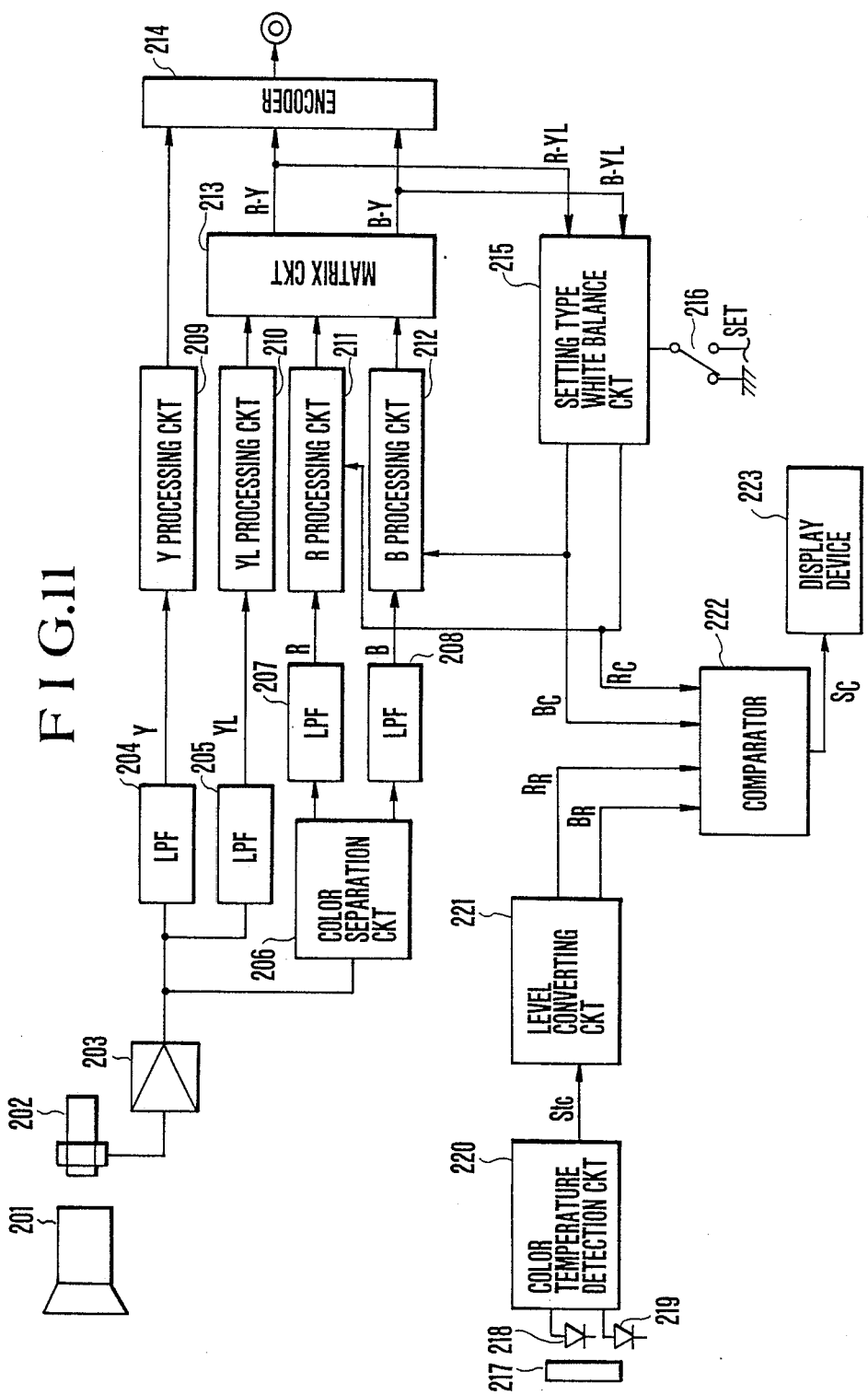
FIG. 11 is a block diagram showing a third embodiment of this invention.

An image sensing apparatus which has both the setting type color balance adjusting function and the follow-up type color balance adjusting function and embodies this invention as a third embodiment thereof is arranged either to give a warning or automatically corrects a set color balance adjustment value in the event that the set value becomes hardly acceptable due to a change in the ambient color temperature occurred after setting the color balance adjustment value. The third embodiment is as described below with reference to FIGS. 11 to 15:

FIG. 11 shows the third embodiment in a block diagram. The illustration includes an image pick-up optical system 201; a camera tube 202 which is, for example, of a frequency separating type; a pre-amplifier 203; a low-pass filter 204 for a luminance signal zone; low-pass filters 205, 207 and 208 for color signal zones; a Y processing circuit 209 which is arranged to perform a luminance signal processing operation; a YL processing circuit 210 which is arranged to perform a low zone luminance signal processing operation; a color separating circuit 206 which is arranged to separate color signals R and B from an image pick-up signal; R processing circuit 211 and B processing circuit 212 which are arranged to process color signals R and B respectively; a matrix circuit 213 which is arranged to form color difference signals; an encoder 214 which forms a composite video signal; and a setting type white balance circuit 215. When a setting switch 216 is pushed, the circuit 215 is set and generate an R gain control voltage Rc and a B gain control voltage Bc which control the gains of the R processing circuit 211 and the B processing circuit 212 in such a way as to cause the levels of the outputs (R−Y) and (B−Y) of the matrix circuit 213 to become zero respectively. The illustration also includes a diffusion plate 217; and R light detector 219; a color temperature detection circuit 220 which is arranged to produce an output ratio signal Stc representing the ratio of the output voltage R of the R light detector 218 and the output voltage B of the B light detector 219 to each other; a level converting circuit 221 which is arranged to receive the output ratio signal Stc and to produce an R reference voltage RR and a B reference voltage BR; a comparison circuit 222 which is arranged to compare the R gains control voltage Rc and the B gain control voltage Bc respectively with the R reference voltage RR and the B reference voltage BR and to produce a warning signal Sc as necessary; and a display device 223 which is arranged to inform the operator of the warning given by the warning signal Sc.

The third embodiment operates as follows: An image of the object to be photographed passes through the photo-taking optical system 201 and is photo-to-electric converted by the camera tube 202. The output of the camera tube is amplified by the pre-amplifier 203. The output of the pre-amplifier 203 passes through the low-pass filter 204 and is processed by the Y processing circuit 209, which produces a luminance signal. The luminance signal is applied to the encoder 214. Further, the output of the pre-amplifier 203 is supplied to the color separating circuit 206 to have the R and B components separated from the signal. These separated components pass through low-pass filters 207 and 208 and come to the R processing circuit 211 and the B processing circuit 212 to be processed by these circuits respectively. These components are then supplied to the matrix circuit 213 together with a luminance signal YL which has passed through the low-pass filter 205 and processed by the YL processing circuit 210. Upon receipt of these inputs, the matrix circuit 213 forms color difference signals (R−YL) and (B−YL). The color difference signals are supplied to the encoder 214. The encoder 214 then forms a composite video signal from the luminance signal Y, the color difference signals (R−YL) and (B−YL) and a synchronizing signal received from a synchronizing circuit which is not shown. The composite video signal which is thus formed is produced from a video output terminal.

The setting type white balance circuit 215 is arranged in the same manner as the circuit 37 shown in FIG. 3. For example, when the setting switch 216 is pushed with a white object's image picked up, the levels of the incoming color difference signals (R−YL) and (B−YL) are compared with a zero level. The gains of the R processing circuit 211 and the B processing circuit 212 are varied by means of the R gain control voltage Rc and the B gain control voltage Bc according to the result of the comparison. By this, the level of the color difference signals (R−YL) and (B−YL) are eventually adjusted to a zero level respectively.

The setting type white balance adjustment operation is thus accomplished in accordance with the known feedback control method.

Meanwhile, the diffusion plate 217 diffuses and condenses the light around an object being photographed by an optical system which is arranged separately from the image sensing or pick-up optical system 201 to allow the light to be incident on the R light detector 218 and the B light detector 219. The detectors 218 and 219 respectively detect the red and blue light components of the light surrounding the object. The outputs of these detectors are subjected to a logarithmic compressing and subtracting operation performed by the color temperature detecting circuit 220. The circuit 220 thus produces an output ratio Stc obtained from the R and B color components. The level converting circuit 221 converts the output ratio Stc into a level and produces reference voltages RR and BR. At the color temperature expressed by the output ratio Stc, these voltages RR and BR are arranged to be used as the R gain control voltage Rc and the B gain control voltage Bc when the elements from the image pick-up optical system 201 to the matrix circuit 213 and to the setting type white balance circuit 215 are normally operating. The comparion circuit 222 produces a warning signal Sc when the absolute value of the difference between the R reference voltage RR and the R gain control voltage Rc and/or that of the difference between the B reference voltage BR and the B gain control voltage Bc comes to exceed a given value. The display device 223 is arranged in a readily observable position and is composed of, for example, an electric lamp, an LED or a letter on an electronic view finder. The device 223 thus warns the operator that the white balance is not in a normal state.

Figure 12:
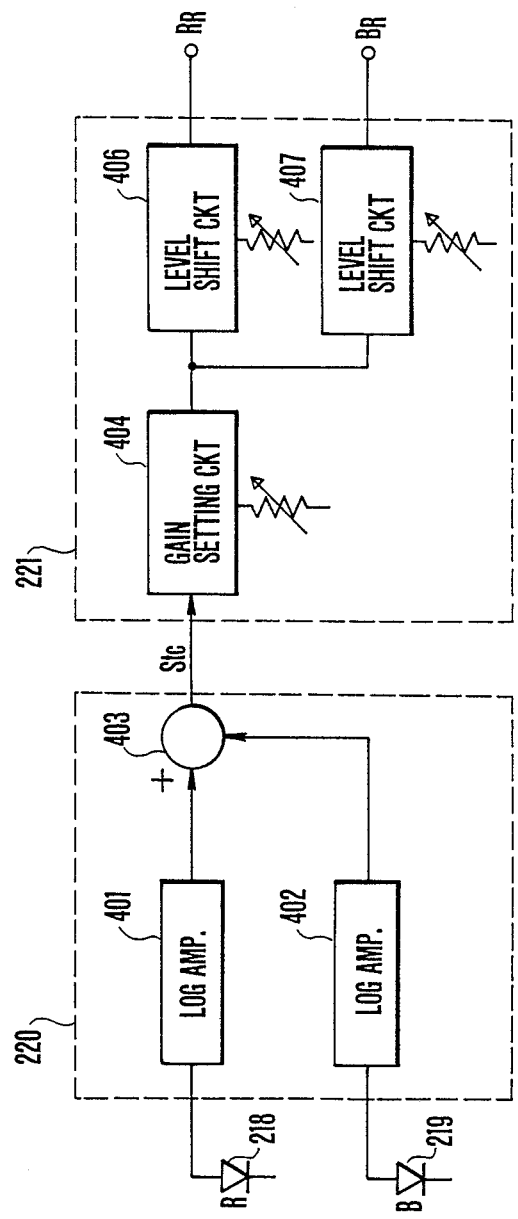
FIG. 12 is a block diagram showing by way of example the arrangement of a color temperature detection circuit and a level shift circuit employed in the third embodiment shown in FIG. 11.
Figure 13A:
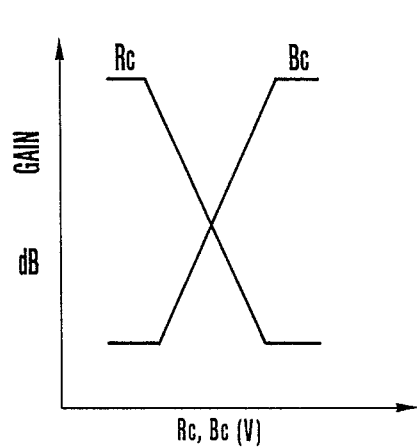
FIGS. 13A to 13C show the operation of the circuit arrangement shown in FIG. 12.
Figure 13B:
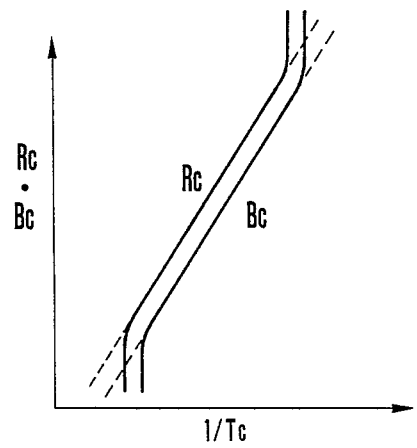
Figure 13C:
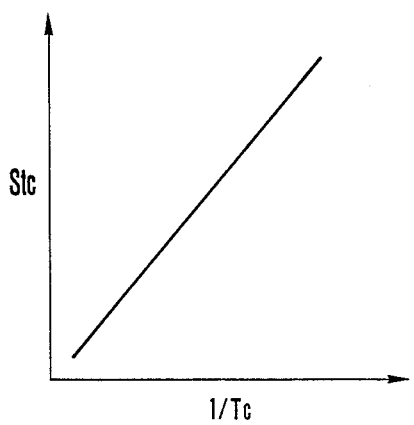

FIG. 12 shows by way of example the arrangement of the color temperature detecting circuit 220 and the level converting circuit 221. Referring to FIG. 12, the output of the R light detector 218 and that of the B light detector 219 are logarithmically compressed by logarithmic amplifiers 401 and 402 and are then subjected to a subtracting process performed by a subtractor 403. As a result, a value Log (R/B) is equivalently obtained. The output ratio Stc which is thus obtained is applied to a gain setting circuit 404, which sets a DC gain. Then the R reference voltage RR and the B reference voltage BR respectively. With the circuits 220 and 221 arranged as stated above, the R and B reference voltages RR and BR can be obtained in proximity to the R and B gain control voltages Rc and Bc. They operate as described below with reference to FIGS. 13A to 13C:

FIG. 13A shows the gain control voltages Rc and Bc of the R processing circuit 211 and the B processing circuit 212 in relation to gains. The characteristic shown in FIG. 13A is readily attainable by using a known balanced amplification type gain control amplifier or the like. When this characteristic is converted, according to the relation of the color temperature of a light source used for illuminating the object to the values R/G and B/G, into the relation of the reciprocal 1/Tc of the color temperature Tc [K] to the R gain control voltage Rc and the B gain control voltage Bc, there obtains an approximately linear characteristic in the middle part as shown in FIG. 13B. Meanwhile, as shown in FIG. 13C, the reciprocal 1/Tc of the color temperature Tc of the light incident on the color temperature detecting circuit 220 of FIG. 12 is in a linear relation to the output ratio Stc. Therefore, this can be approximated to the linear characteristic of FIG. 13B through linear transformation, i.e. by adjusting the inclination of the straight line of the first degree and the y-segment thereof. This indicates that, with the circuits 220 and 221 of FIG. 12 employed, the R reference voltage RR and the B reference voltage BR can be obtained in proximity to the R and B gain control voltages Rc and Bc respectively.

Figure 14:
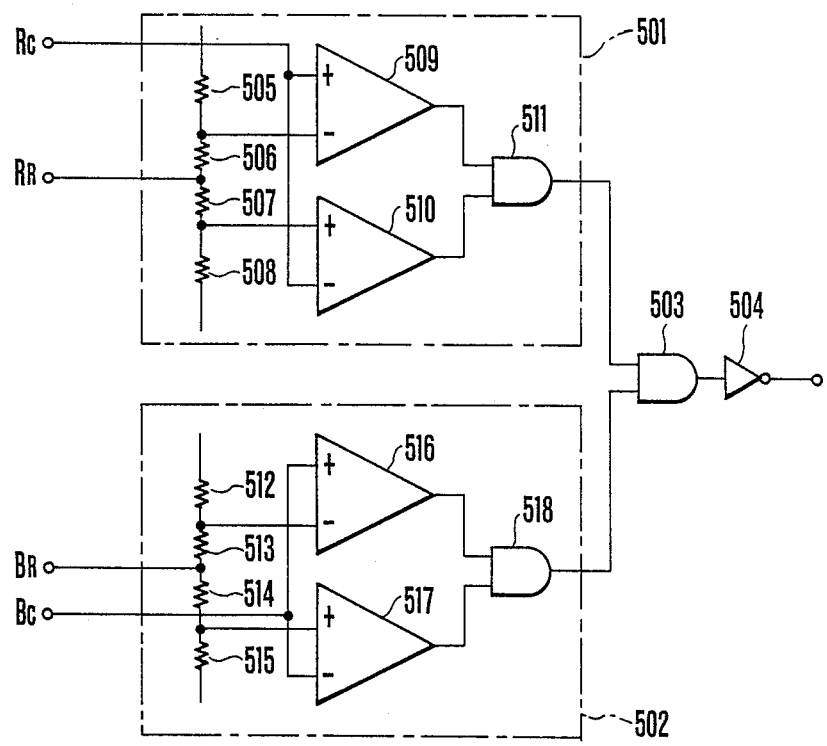
FIG. 14 is a circuit diagram showing by way of example the arrangement of a comparison circuit included in FIG. 11.

FIG. 14 shows by way of example the arrangement of the comparison circuit 222. Referring to FIG. 14, the comparison circuit 222 includes window comparators 501 and 502; an AND gate 503; and a NOT gate 504. In the window comparator 501, there are provided resistors 505 to 508 which are arranged to set the window width of the color signal R; operational amplifiers 509 and 510; and an AND gate 511. The other window comparator 502 consists of resistors 512 to 515 for setting the window width of the color signal B; operational amplifiers 516 and 517; and an AND gate 518.

Figure 15:
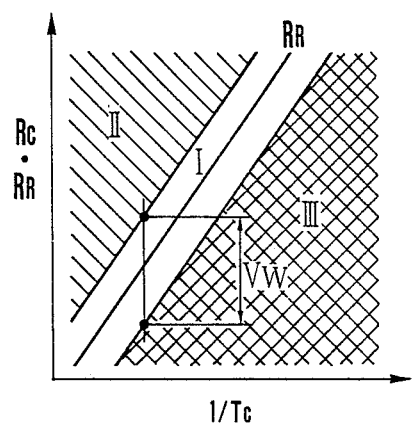
FIG. 15 shows the operation of the third embodiment.

Assuming that a voltage of the window width set by the resistors 505 to 508 is expressed as VW as shown in FIG. 15, if the R gain control voltage Rc is within an area I which represents the width of the voltage VW (having the R reference voltage RR at the center thereof), the output of the window comparator 501 is at a high level indicating a normal operation. However, with the difference between the R gain control voltage Rc and the R reference voltage RR becoming larger, when the voltage Rc enters another area II or III, the output level of the window comparator 501 becomes low. The window comparator 502 for the color signal B also operates in the same manner. The outputs of the window comparators 501 and 502 are produced via the AND gate 503 and the NOT gate 504. Therefore, if any of these window comparators 51 and 502 comes to produce a low level output, the level of the warning signal Sc becomes high to produce a warning. In other words, when either the color signal R or the color signal B comes to have an abnormal white balance, the display device 223 informs the operator of this abnormality.

In this embodiment, as described above, the gain control output of the setting type white balance circuit 215 and the level shifted output of the detecting circuit 220 which detects the color temperature of the object illuminating light source are compared with each other at the comparison circuit 222. When the absolute value of difference between these outputs comes to exceed a given value, a warning is given to the operator by the display device 223. This arrangement enables the operator to know the occurrence of an abnormal white balance condition.

Accordingly, this enables the operator to again perform a white balance setting operation before commencement of a photographing operation, so that the operation always can be performed under a normal white balance condition.

In the case of the embodiment described above, this invention is applied to a color television camera of the single tube type. However, this invention is readily applicable also to cameras of other types including, for example, the two-tube, three-tube, single-plate, two-plate and three-plate types.

In each of these cameras of different types, the image pick-up optical system does not have to include the embodiment, the comparison circuit 222 is arranged to compare the gain control voltage with the reference voltage for each of the R and B color signals separately from the other. However, the operation of the comparison circuit can be accomplished in about the same manner even with use of a single reference voltage, instead of two, if the R and B gain control voltages Rc and Bc are of about the same characteristic. It is also possible to have the operation accomplished about the same manner, with the exception of some special case, by comparing only one of the R and B color signals with the reference voltage.

Figure 16:
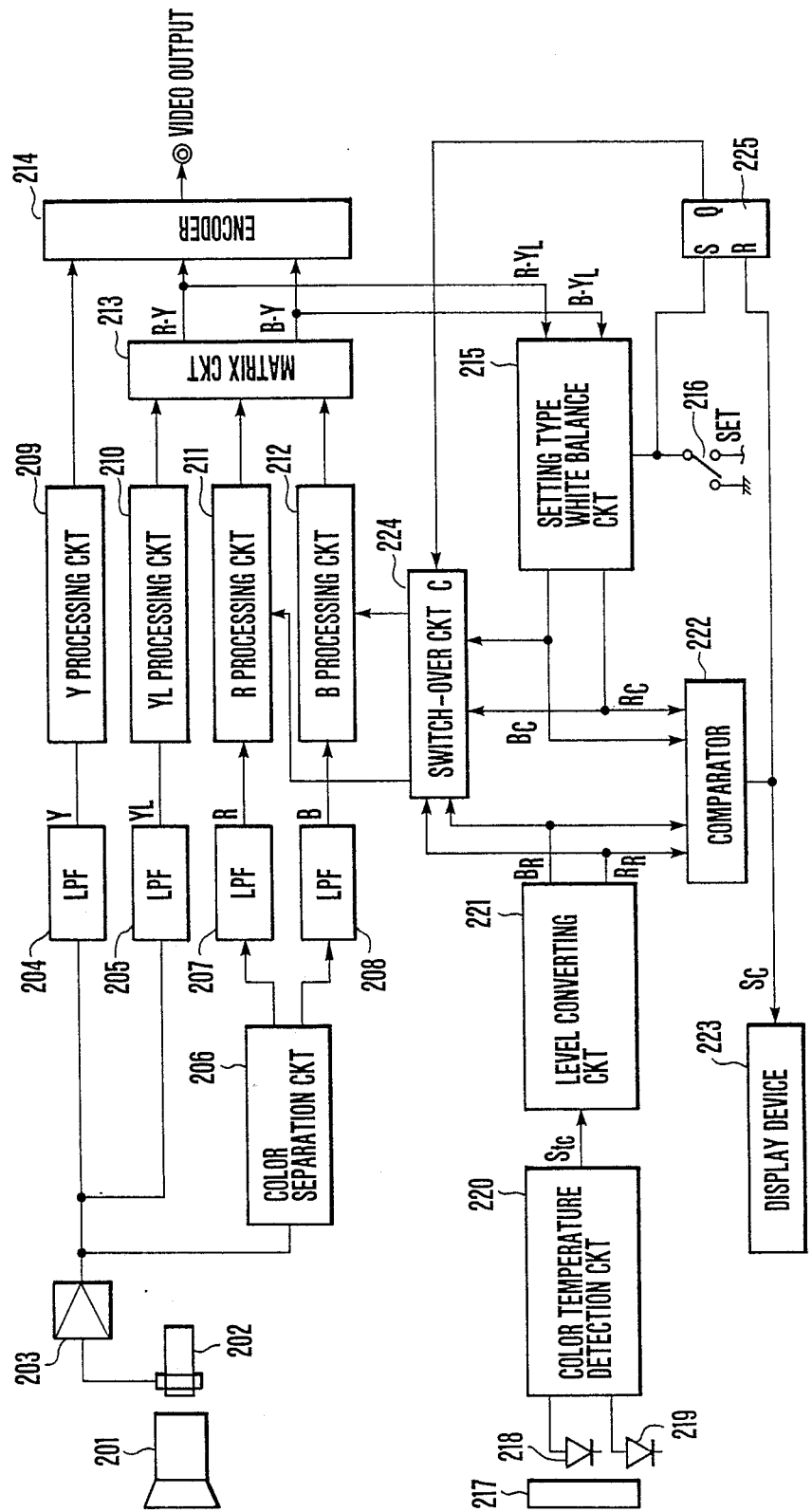
FIG. 16 is a block diagram showing an image sensing apparatus arranged as a fourth embodiment of this invention.

This invention is applicable also to a color television camera of the kind wherein the use of the output of the color temperature detection circuit 220 and the use of the R and B gain control voltages Rc and Bc produced from the setting type white balance circuit 215 are switched over from one to the other and the white balance adjustment can be accomplished by means of the two. Further, in this specific embodiment, an abnormality in white balance is arranged to be displayed upon detection thereof. It is possible to effect switch-over to the use of the output of the color temperature detection circuit 220 concurrently with this display. FIG. 16 shows an embodiment which is arranged to be capable of effecting this switch-over.

In FIG. 16, the same elements as those shown in FIG. 11 are indicated by the same reference numerals and symbols as in FIG. 11 and details of them are omitted from the following description: The embodiment includes a switch-over circuit 224. The circuit 224 supplies the R processing circuit 211 and the B processing circuit 212 with the R reference voltage RR and B reference voltage BR produced from the level converting circuit 221 in case that a signal from a switch-over control terminal c is at a low level and with the gain control voltages Rc and Bc of the setting type white balance circuit 215 when the signal from the terminal c is at a high level. An RS—FF 225 has its set input terminal S connected to the movable terminal of a switch 216, its reset input terminal R to the output terminal of the comparison circuit 222 and its output terminal Q to the switch-over control terminal c of the switch-over circuit 224.

In the embodiment described, when the switch 216 is turned on, the setting type white balance circuit 215 is caused to operate. After completion of setting of the white balance adjustment, the RS—FF 225 is set. Then, the switch-over circuit 224 transmits the output of the setting type white balance circuit 215 to the R processing circuit 211 and the B processing circuit 212. By this, white balance is adjusted in a preset manner. After that, when a warning signal Sc is produced at a high level from the comparison circuit 222 with the ambient color temperature having varied to a great degree, the RS—FF 225 is reset. In response to this, the switch-over circuit 224 comes to transmit the output of the level converting circuit 221 to the R processing circuit 211 and the B processing circuit 212. Thus, in the event of a great change in the color temperature of the light surrounding the object after the setting type color balance adjustment, the setting type adjustment is automatically shifted to the follow-up type white balance adjustment, so that color balance adjustment always can be adequately carried out.

The level converting circuit 221 is arranged to be a linear transformation circuit. However, the accuracy of the reference voltage can be further enhanced by replacing this arrangement with some arrangement to carry out linear transformation of second or higher order or to carry out non-linear transformation. If necessary, a portion of the arrangement of the embodiment may be replaced with some micro-program of a microcomputer.

In accordance with the arrangement of the embodiment described, a warning is given to the operator in the event of occurrence of an abnormality in the white balance, so that a photographing operation under an abnormal condition can be effectively prevented. This advantage enables the operator to perform photographing always in a normal white balance adjusted state.

What is claimed is:
1. An apparatus comprising:
 (a) image pick-up means for converting radiation into an electrical signal corresponding to the color of said radiation;
 (b) first adjusting means for adjusting the color balance of said electrical signal, said means being arranged to perform color balance adjustment on the basis of the color balance of said electrical signal;
 (c) second adjusting means for adjusting the color balance of said electrical signal, said means being arranged to perform color balance adjustment on the basis of the output of color measuring means arranged separately from said image pick-up means; and
 (d) selecting means for selecting at least one of said first and second adjusting means, said selecting means being arranged to hold the output of said color measuring means in selecting said second adjusting means and cause said second adjusting means to operate on the basis of said output held thereby.

2. An apparatus of claim 1, wherein said second adjusting means includes:
   (a) color measuring means which is arranged separately from said image pick-up means to produce a signal corresponding to the color balance of said electrical signal; and
   (b) control means which adjusts the color balance of said electrical signal according to the output of said color measuring means.

3. An apparatus of claim 1, wherein said first adjusting means includes:
   (a) detecting means for detecting the color balance condition of a signal generated by converting the output of said image pick-up means;
   (b) control means which adjusts the color balance of said electrical signal according to the result of detection by said detecting means when a driving signal is received; and
   (c) driving means for generating said driving signal which drives said control means.

4. An apparatus of claim 1, wherein said selecting means includes:
   (a) power supply control means for controlling the state of a power supply to said apparatus; and
   (b) selecting means for selecting either said first or second adjusting means according to the state of the power supply controlled by said power supply control means.

5. An apparatus comprising:
   (a) image pick-up means for converting radiation into an electrical signal corresponding to the color of said radiation;
   (b) means for generating a detection output corresponding to the color of said radiation, said means being arranged separately from said image pick-up means;
   (c) an amplifier for amplying said electrical signal according to the color of said radiation;
   (d) means for detecting the color balance condition of said electrical signal and for generating a first signal for controlling the degree of amplification to be made by said amplifier;
   (e) means for generating a second signal for controlling the amplifying degree of said amplifier according to said detection output; and
   (f) selecting means arranged to compare said first and second signals with each other and to select at least one of said first and second signals on the basis of the result of said comparison.

6. An apparatus of claim 5, wherein said selecting means is arranged to apply said second signal to said amplifier when a difference between said first and second signals is greater than a given value.

7. An apparatus of claim 5, wherein said first signal generating means generates the first signal which is arranged to control the amplifying degree of said amplifier in such a way as to bring the color balance of said electrical signal into a given condition.

8. An apparatus of claim 5, wherein said second signal generating means includes:
   (a) a manual operating switch having first and second switching positions; and
   (b) signal generating means which is arranged to hold a signal corresponding to the output of said detection output generating means obtained at the time of change-over of said switch from the first position to the second position thereof and to generate said second signal on the basis of said output.

9. An apparatus comprising:
   (a) image pick-up means for converting radiation into an electrical signal corresponding to the color of said radiation;
   (b) means for generating a detection output corresponding to the color of said radiation, said means being arranged separately from said image pick-up means;
   (c) an amplifier for amplifying said electrical signal according to the color of said radiation;
   (d) means for detecting the color balance condition of said electrical signal and for generating a first signal for controlling the degree of amplification to be made by said amplifier; and
   (e) comparison means for comparing said first signal with said second signal.

10. An apparatus of claim 9, further comprising informing means for informing the result of comparison made by said comparison means.

11. An apparatus of claim 10, wherein said informing means is display means which makes a display on the basis of said result of comparison.

12. An apparatus of claim 9, further comprising selecting means which selects one of said first and second signals on the basis of the result of comparison made by said comparison means and applies said selected signal to said amplifier.

13. An apparatus comprising:
   (a) image pick-up means for converting radiation into an electrical signal corresponding to the color of said radiation;
   (b) first adjusting means for adjusting the color balance of said electrical signal;
   (c) second adjusting means for adjusting color balance in a manner different from the color balance adjustment made by said first adjusting means;
   (d) recording means for recording a signal corresponding to said electrical signal, said recording means being arranged to start recording in response to a trigger signal; and
   (e) selecting means for selecting at least one of said first and second signals, the selecting state of said selecting means being arranged to change in synchronism with commencement of recording by said recording means.

14. An apparatus of claim 13, wherein said first adjusting means is arranged to perform color balance adjustment on the basis of the color balance of said electrical signal.

15. An apparatus of claim 13, wherein said second adjusting means includes:
   (a) color measuring means disposed separately from said image pick-up means; and
   (b) means for performing color balance adjustment on the basis of the output of said color measuring means.

16. An apparatus of claim 14, wherein said second adjusting means includes:
   (a) color measuring means disposed separately from said image pick-up means; and
   (b) means for performing color balance adjustment on the basis of the output of said color measuring means.

17. An apparatus of claim 16, wherein said selecting means is arranged to select said first adjusting means in synchronism with commencement of recording by said recording means.

18. An apparatus of the kind adjusting the color balance of a color image signal produced from a color image sensor, comprising:
   (a) first signal generating means for generating a first signal for adjusting the color balance of said color image signal;
   (b) second signal generating means for generating a second signal for adjusting the color balance of said color image signal, said second signal being different from said first signal; and
   (c) actuating means for actuating at least one of said first and second signal generating means on the basis of the result of comparison of said first and second signals.

19. An apparatus of claim 18, wherein said actuating means actuates only one of said first and second signal generating means when a difference between said first and second signals exceeds a given value.

20. An apparatus for adjusting the color balance of a color image signal outputted from a color image sensor, comprising:
   (a) first means for producing a first signal for adjusting the color balance of said color signal;
   (b) second means for producing a second signal for adjusting the color balance of said color signal;
   (c) comparison means for comparing said first signal with said second signal;
   (d) selection means for selecting outputs of said first means and/or said second means in response to results of comparison by said comparison means; and
   (e) control means for controlling the color balance of said color image signal in response to the outputs selected by said selection means.

21. An apparatus according to claim 20, further comprising warning means for warning in response to results of comparison by said comparison means.

22. An apparatus according to claim 21, wherein said warning means includes indication means.

23. An apparatus according to claim 20, wherein said control means includes means for amplifying said color image signal according to the outputs selected by said selection means.

* * * * *